Jan. 4, 1949. E. G. ULRICH 2,458,226
TRUCK ANCHOR
Filed Sept. 27, 1945 2 Sheets-Sheet 2
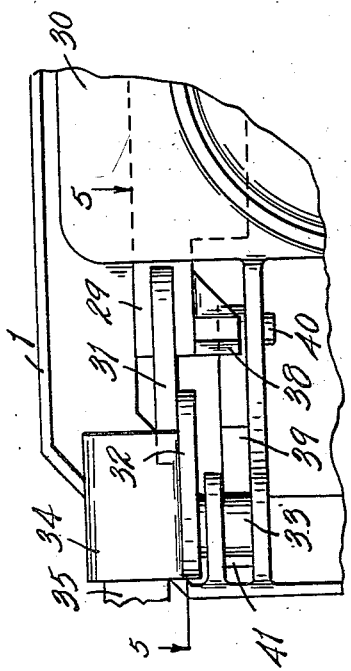
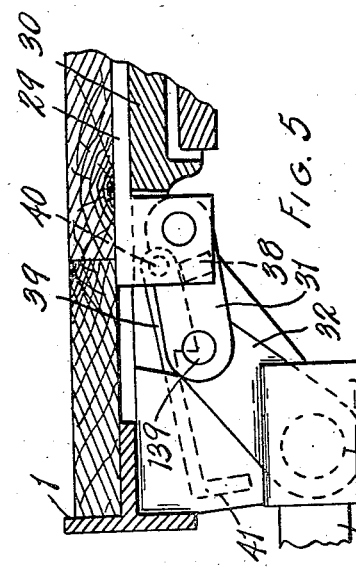
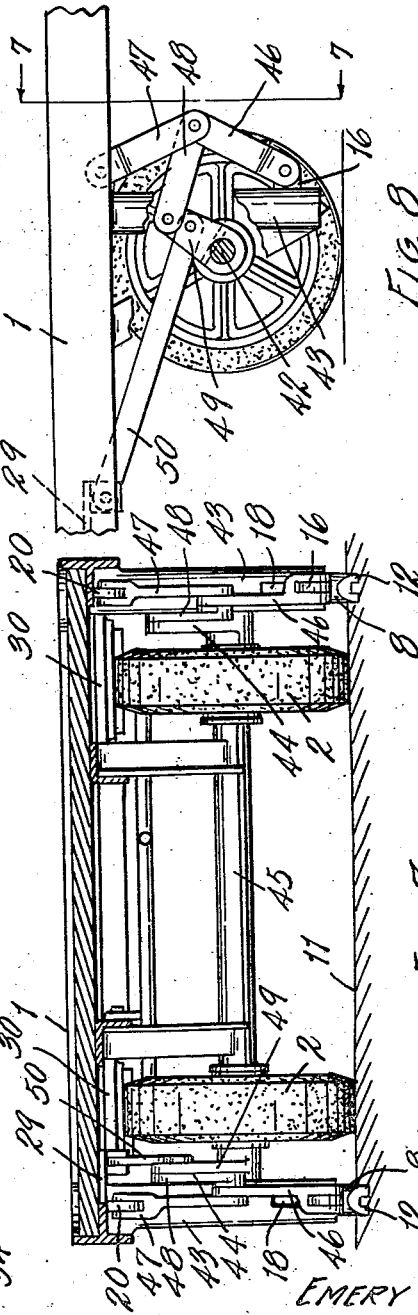
INVENTOR.
EMERY G. ULRICH
BY
Earl D. Chappell
ATTORNEYS.

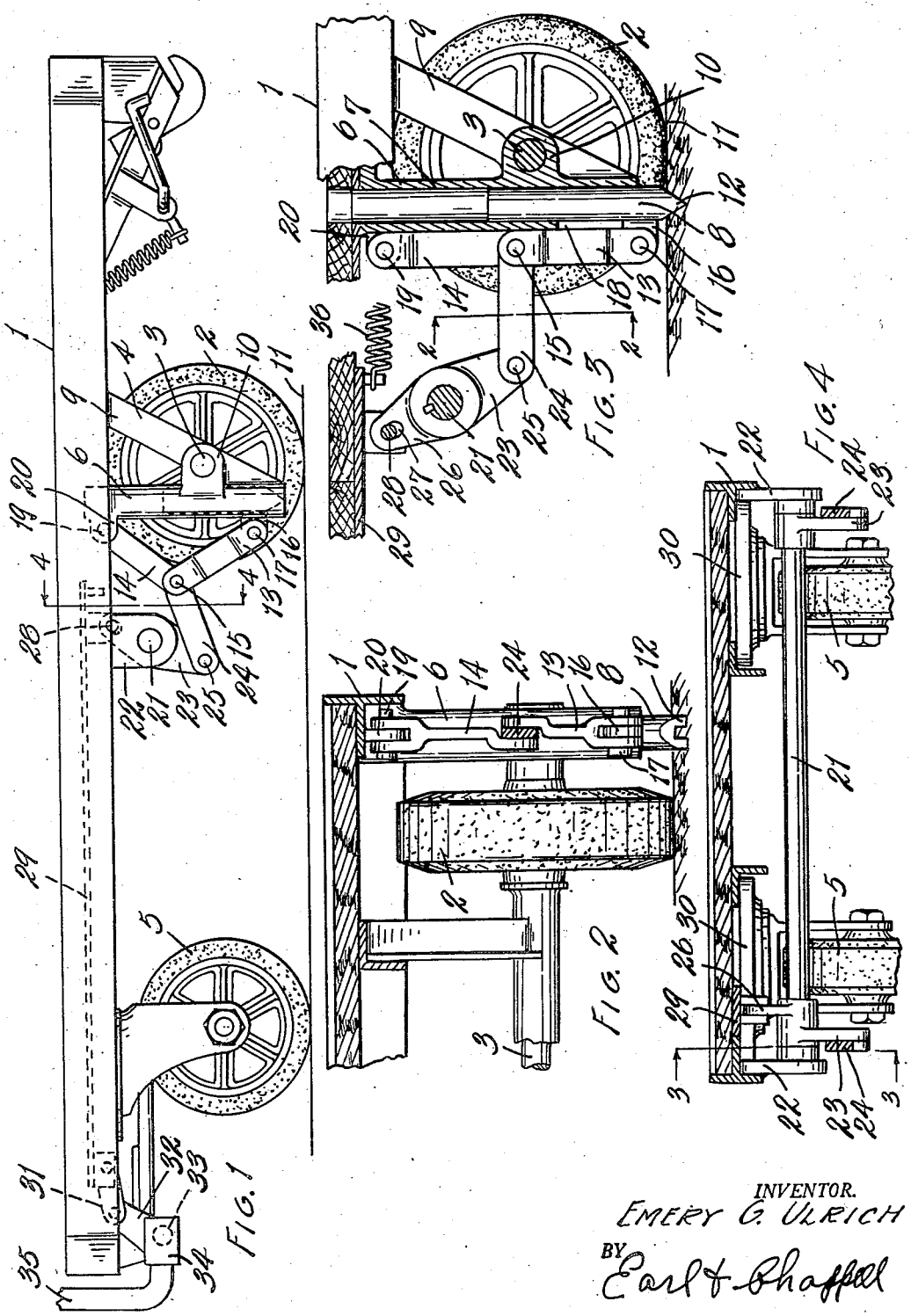

Patented Jan. 4, 1949

2,458,226

UNITED STATES PATENT OFFICE 2,458,226

TRUCK ANCHOR

Emery G. Ulrich, Toledo, Ohio

Application September 27, 1945, Serial No. 618,965

14 Claims. (Cl. 188—5)

1

This invention relates to improvements in truck anchors.

The main objects of this invention are:

First, to provide a truck embodying an anchor which is well adapted for use in freight houses, warehouses, and in the handling and shipping of freight and merchandise which may be used in shipment in freight cars, avoiding the necessity of unloading the trucks, the trucks being firmly anchored in the cars.

Second, to provide a structure having these advantages which is relatively light in weight and at the same time strong and durable and easily manipulated.

Third, to provide an anchoring means for trucks in which the anchor members are carried by the axle hangers, the axle hangers thus performing a double function and further positioning the anchor members in an effective relation to the wheels.

Objects relating to details and economies of the invention will appear from the description to follow. The invention is defined and pointed out in the claims.

Preferred embodiments of the invention are illustrated in the accompanying drawings, in which:

Fig. 1 is a side elevation of a truck embodying my invention, the anchor members being shown in retracted position.

Fig. 2 is an enlarged fragmentary view partially in transverse section on line 2—2 of Fig. 3 with the anchor in actuated position.

Fig. 3 is a fragmentary view partially in longitudinal section on line 3—3 of Fig. 4.

Fig. 4 is a fragmentary transverse section on line 4—4 of Fig. 1.

Fig. 5 is an enlarged fragmentary view partially in section on broken line 5—5 of Fig. 6 showing details of the operating mechanism.

Fig. 6 is a fragmentary inverted view showing further details of the operating mechanism.

Fig. 7 is a transverse section of a modified form or embodiment of my invention with the anchor members in actuated position, on line 7—7 of Fig. 8.

Fig. 8 is a fragmentary side elevational view, partially broken away in section, of the structure shown in Fig. 7.

In the accompanying drawings, I have illustrated my invention as embodied in a truck adapted for the handling of freight and the like and to be run into freight cars for shipment of merchandise thereon without unloading. It also

2 has a wide adaptation of use in factories and the like where it is desired to anchor the trucks.

The embodiment of my invention illustrated is of the trailer type, that is, it is provided with coupling means for coupling a train of the trucks together. That, however, forms no part of my present invention. The body 1 is shown mainly in conventional form. Carrying wheels 2 are mounted on the axle 3 carried by the hangers 4. The front wheels 5 are of the caster type. The hangers 4 comprise vertical members 6 having bores 7 therein constituting ways for the anchor members 8.

The hangers comprise a reinforcing and bracing member 9, the hangers being provided with bosses 10 receiving the axle 3. The hangers are suitably mounted on the truck frame (commonly it would be by the use of bolts or rivets) the securing means not being illustrated.

The hangers project substantially below the axles so that their lower ends or the lower ends of the anchor way portions thereof terminate adjacent the supporting platform or surface 11 for the wheels.

The anchors are provided with projecting pointed teeth 12 which are readily embedded in the wooden deck or floor of a freight car or loading decks or platforms. Each anchor member is provided with an actuating toggle consisting of a pair of coacting toggle links 13 and 14 which are pivotally connected to each other at 15. The link 13 is pivotally connected at 17 to the ear 16 on the anchor projecting through the slot 18 in the anchor member way. This performs the double function of preventing rotative movement of the anchor member 8 and providing the lower pivot 17 for link 13 of the toggle mechanism. The link 14 is pivotally connected at 19 on the projecting ear 20 on the hangers located in alignment with the ear 16.

The toggles are actuated from a common rockshaft 21 rockably mounted on the hangers 22 and extending transversely across the truck below the platform thereof, see Fig. 4. This rockshaft is provided with arms 23 connected by the links 24 to the toggle pivots 15, the links being connected to the arms at 25.

The rockshaft 21 is provided with an arm 26 slotted at 27 to receive the pin 28 on the actuating link 29 which is slidably mounted on the under side of the truck and extends forwardly, the race bearing member 30 of the caster wheels 5 constituting a support for this link.

The actuating link 29 is connected by the short coupling link 31 to the arm 32 pivoted at 33 on the body 1 and provided with a socket 34 receiving the actuating lever 35.

A return spring 36 is connected at one end to the truck body, the connection not being illustrated, and at the other end to the actuating link 29, see Fig. 3. This spring returns the actuating link 29 to the position shown in Fig. 1 after operation thereof by lever 35 thereby breaking the toggles, and retracting the anchor members 8.

To lock the anchor members in engaging position, the actuating link is provided with a detent 38 which is automatically engaged by the dog 39 pivoted at 40 on the body 1. The dog has a jaw 139 which engages the detent 38 when the parts are in actuated position. This dog projects forwardly and is provided with a down-turned end 41 which may be engaged by a tool or by the hand to disengage the dog, thus allowing the anchors to retract.

It is not intended that the entire load of the truck will be carried by the anchors when they are in projected position. There is, however, a tendency for the anchors to lift the load when the anchors are actuated or the load to resist lifting and cause the anchors to penetrate the floor or deck which is commonly of wood. The anchors may be readily engaged and are easily released.

In the embodiment of my invention shown in Figs. 7 and 8, the axle 42 is rotatably or rockably mounted in the hangers 43 which are substantially the same as those of the embodiment described except that they are reversed. The axle is provided with arms 44 at the outer sides of the wheels which are carried by the tubular shaft 45 mounted on the axle. The toggle members 46 and 47 corresponding to the members 13 and 14 collapse rearwardly, the links 48 corresponding to the links 24 being connected to the arms 44 on the axle. The axle is also provided with an arm 49 connected by the link 50 to the actuating link 29. The remainder of the actuating mechanism for the anchor is the same as that previously described.

Both embodiments of my invention are highly practical, the axle hangers serving the additional purpose of supporting ways for the anchor members and thus avoiding the necessity of providing additional anchor supporting members. This economises on weight and the anchor members are effectively positioned relative to the wheels.

I have not attempted to illustrate or describe other embodiments or adaptations of my invention as it is believed that this disclosure will enable those skilled in the art to embody or adapt the same as may be desired.

Having thus described my invention, what I claim as new and desire to secure by Letters Patent, is:

1. The combination with a truck body, carrying wheels and axle, of axle hangers provided with vertical bore-like ways having vertical slots in the lower ends thereof, said ways terminating adjacent the surface on which the carrying wheels are supported, anchor members slidable in said ways to be projected therefrom and provided with ears projecting through said slots and acting to prevent rotative movement of the anchor members in the ways, an actuating toggle for each anchor member, said actuating toggles comprising pivotally connected links, one toggle link being pivotally connected at its upper end to the associated hanger and the other to the ear on the anchor member, an actuating rockshaft common to both toggles and provided with arms, links connecting said arms to the connecting pivots of said toggle links, means for actuating said rockshaft, and means for locking the toggles in actuated position.

2. The combination with a truck body, carrying wheels and axle, of axle hangers provided with vertical ways, anchor members slidable in said ways, an actuating toggle for each anchor member, said actuating toggles comprising pivotally connected links, one toggle link being pivotally connected at its upper end to the associated hanger and the other to the anchor member, an actuating rockshaft common to both toggles and provided with arms, links connecting said arms to the connecting pivots of said toggle links, means for actuating said rockshaft, and means for locking the toggles in actuated position.

3. The combination with a truck body, carrying wheels and axle, of axle hangers provided with ways, anchor members slidable in said ways, an actuating toggle for each anchor member, said actuating toggles comprising pivotally connected links, one toggle link being pivotally connected at its upper end to the associated hanger and the other to the anchor member, an actuating rockshaft common to both toggles and provided with arms, links connecting said arms to the connecting pivots of said toggle links, an actuating link slidably mounted on said body, said rockshaft being provided with an arm having pin and slot engagement with the inner end of said actuating link, an actuating lever at one end of the body connected to the outer end of said actuating link, a locking dog, said actuating link being provided with a keeper with which said dog engages when the link is actuated to anchor engaging position, and retracting means for said anchors.

4. The combination with a truck body, carrying wheels and axle, of axle hangers provided with anchor members slidable in said ways, an actuating toggle for each anchor member, an actuating rockshaft common to both toggles and provided with arms, links connecting said arms to the said toggles, an actuating link slidably mounted on said body, said rockshaft being provided with an arm having pin and slot engagement with the inner end of said actuating link, an actuating lever at one end of the body connected to the outer end of said actuating link, a locking dog, said actuating link being provided with a keeper with which said dog engages when the link is actuated to anchor engaging position, and retracting means for said anchors.

5. The combination with a truck body, carrying wheels, anchor members mounted adjacent the wheels to engage the surface on which the wheels are supported when the anchors are actuated, an actuating toggle for each anchor member, an actuating rockshaft common to both toggles and provided with arms, links connecting said arms to the said toggles, an actuating link slidably mounted on said body, said rockshaft being provided with an arm having pin and slot engagement with the inner end of said actuating link, an actuating lever at one end of the body connected to the outer end of said actuating link, a locking dog, said actuating link being provided with a keeper with which said dog engages when the link is actuated to anchor engaging position, and retracting means for said anchors.

6. A truck of the class described comprising carrying wheels, an axle therefor, axle hangers, anchor members mounted on said hangers to be projected to actuated position to anchoringly engage the wheel supporting surface adjacent the wheels, an actuating toggle for each anchor member, means for simultaneously actuating said toggles comprising a rockshaft provided with arms operatively connected to the toggles, a slidably supported actuating link, said rockshaft being provided with an arm having pin and slot engagement with the inner end of said actuating link, an actuating lever at one end of the body connected to the outer end of said actuating link, a locking dog, said actuating link being provided with a keeper with which said dog engages when the link is actuated to anchor engaging position, and a return spring connected to said actuating link.

7. A truck of the class described comprising carrying wheels, anchor members mounted to be projected to actuated position to anchoringly engage the wheel supporting surface adjacent the wheels, an actuating toggle for each anchor member, means for simultaneously actuating said toggles comprising a rockshaft provided with arms operatively connected to the toggles, a slidably supported actuating link, said rockshaft being provided with an arm having pin and slot engagement with the inner end of said actuating link, an actuating lever at one end of the body connected to the outer end of said actuating link, a locking dog, said actuating link being provided with a keeper with which said dog engages when the link is actuated to anchor engaging position, and a return spring connected to said actuating link.

8. A truck of the class described comprising a truck body, carrying wheels, an axle therefor, axle hangers, anchor members mounted on said hangers to be projected to actuated position to anchoringly engage the wheel supporting surface adjacent the wheels, an actuating toggle for each anchor member, means for simultaneously actuating said toggles comprising a rockshaft provided with arms operatively connected to the toggle, and an actuating lever at one end of the body operatively connected to the rockshaft.

9. A truck of the class described comprising carrying wheels, an axle therefor, axle hangers provided with guide ways, anchor members mounted for longitudinal sliding movement within said guideways to be projected to actuated position to anchoringly engage the wheel supporting surface adjacent the wheels, and means for simultaneously actuating said anchor members.

10. The combination in a truck, of carrying wheels and axle therefor, an axle hanger provided with a vertical bore-like way having a vertical slot in the lower end thereof, said way terminating adjacent the surface on which the adjacent carrying wheel is supported, an anchor member slidably mounted in said way to be projected therefrom and provided with an ear projecting through said slot and acting to prevent rotative movement of the anchor member in the way, an actuating toggle for said anchor member comprising pivotally connected links, one toggle link being pivotally connected to said ear on said anchor member and the other to a relatively fixed part, and means for actuating said toggle to project the anchor member.

11. The combination in a truck, of carrying wheels and axle therefor, an axle hanger provided with a way, an anchor member slidably mounted on said way, an actuating toggle for said anchor member, and means for actuating said toggle.

12. The combination in a truck provided with carrying wheels, of a wheel hanger provided with a guideway, an anchor member slidably mounted longitudinally of itself within said guideway, an actuating means for projecting said anchor member, means for automatically locking said anchor in its projected position, and means for returning said anchor when said locking means is released.

13. A truck of the class described comprising carrying wheels, an axle provided with arms, axle hangers provided with ways, the axle being rotatably mounted in said hangers, anchor members slidable on said ways to be projected to actuated position to anchoringly engage the wheel supporting surface adjacent the wheels, an actuating toggle for each anchor member, links connecting said toggles to said arms on said axle, and means for rocking said axle to actuate said toggles.

14. A truck of the class described comprising carrying wheels, an axle, an axle hanger provided with a way, the axle being rotatably mounted in said hanger, an anchor member carried by said way to be projected to actuated position to anchoringly engage the wheel supporting surface adjacent the wheel, an actuating toggle for said anchor member, an arm on said axle, a link connecting said toggle to said arm on said axle, and means for rotating said axle to actuate said toggle.

EMERY G. ULRICH.

REFERENCES CITED

The following references are of record in the file of this patent:

UNITED STATES PATENTS

| Number | Name | Date |
|---|---|---|
| 1,038,737 | Finking | Sept. 17, 1912 |
| 2,020,386 | Ulrich | Nov. 12, 1935 |